United States Patent
David et al.

(10) Patent No.: US 6,391,252 B1
(45) Date of Patent: May 21, 2002

(54) METHOD OF MANUFACTURING SELF-SOLDERING SHAPED PIECES BY POWDER METALLURGY

(75) Inventors: François David, Berck; Yves Leroy, Arganchy; Jean-Pierre Huchin, Chatellerault; André Malie, Targe, all of (FR)

(73) Assignees: Metal Process Systems, Boulogne-Billancourt; Snecma Services, Paris, both of (FR)

( * ) Notice: Subject to any disclaimer, the term of this patent is extended or adjusted under 35 U.S.C. 154(b) by 0 days.

(21) Appl. No.: 09/581,529

(22) PCT Filed: Nov. 9, 1999

(86) PCT No.: PCT/FR99/02747

§ 371 Date: Jul. 7, 2000

§ 102(e) Date: Jul. 7, 2000

(87) PCT Pub. No.: WO00/27570

PCT Pub. Date: May 18, 2000

(30) Foreign Application Priority Data

Nov. 10, 1998 (FR) .............................. 98 14119

(51) Int. Cl.$^7$ .................................................. B22F 3/12
(52) U.S. Cl. .............................. 419/36; 419/26; 419/37
(58) Field of Search .............................. 419/26, 36, 37

(56) References Cited

FOREIGN PATENT DOCUMENTS

| EP | 0587483 | 3/1994 |
| EP | 0626224 | 11/1994 |

*Primary Examiner*—Daniel J. Jenkins
(74) *Attorney, Agent, or Firm*—Greenblum & Bernstein, P.L.C.

(57) ABSTRACT

The present invention concern a method using powder metallurgy for producing molded parts intended to be assembled by self-brazing to metal parts capable of receiving them and said receiving parts. The method comprises forming a homogenous mixture of a basic metal powder, brazing powder and a liquid binding agent which is injection molded to form a self-brazing part.

28 Claims, 4 Drawing Sheets

METHOD OF MANUFACTURING SELF-SOLDERING SHAPED PIECES BY POWDER METALLURGY

BACKGROUND OF THE INVENTION

1. Field of the Invention

The present invention concerns a method using powder metallurgy for producing molded parts intended to be assembled by self-brazing to metal parts capable of receiving them and said receiving parts.

The present invention also concerns a method for assembling such molded parts to receiving metal parts.

As used in the present document, the term "self-brazing" means the autogenous brazing of the molded part on the receiving metal part, the elements effecting brazing being contained in the molded part.

The operation of self-brazing of the molded part on the metal part may comprise or be followed by a diffusion heat treatment in the solid state, thus constituting what is commonly termed a brazing-diffusion operation, which treatment is intended to homogenize the composition and the structure of the molded parts and of the area of connection by self-brazing.

2. Discussion of Background Information

European Patent No. 075,497 teaches a method for assembly by brazing-diffusion of metal parts, such as components made of superalloy for gas turbines, which consists in interposing between the surfaces to be assembled a connecting layer of overall composition corresponding to a superalloy, and in carrying out a brazing-diffusion treatment on this assembly.

The connecting layer consists of an intimate mixture of two alloy powders, the first powder, termed "basic powder", being a superalloy powder, and the second powder being a brazing powder of Ni—Co—Si—B alloy the liquidus temperature of which is below the solidus temperature of the mechanical parts and of the basic powder.

The relatively low melting temperature of the brazing powder is provided by its content of Si and/or of B.

As used in the present document, the term "melting element" designates an element such as, by way of non-limiting example, silicon or boron, which substantially lowers the solidus temperature of the alloy into which it is introduced.

The brazing-diffusion operation is carried out at a temperature such that the brazing powder melts and, flowing between the basic powder grains, makes it possible to decrease the porosity very rapidly and to obtain a compact connecting layer independently of the volume of powder employed.

The application of the temperature is then maintained to diffuse the melting element or elements B and Si. The homogenization of the composition resulting from such diffusion raises the liquidus temperature of the melted areas which solidify while the temperature is maintained, diffusion continuing in the solid state.

The result at the end of the brazing-diffusion operation is a homogeneous and dense structure with an absence of discontinuity between the parts to be assembled.

European Patent No. 075,497 gives several examples of application to superalloys based on nickel or based on cobalt.

One of the examples concerns the reconditioning of a fixed turbine blade, made of cobalt-based alloy KC25NW according to the AFNOR designation, cracked by thermal fatigue. AFNOR is the French Standards Committee. According to the AFNOR designation, the alloy KC25NW is a cobalt alloy containing approximately 25% chromium based on the weight of cobalt, and lesser amounts of nickel and tungsten.

For that, a paste containing an intimate mixture of the basic powder of Co superalloy, the brazing powder of Ni—Co—Si—B alloy and a volatile binding agent is applied in the previously cleaned and/or widened crack.

The binding agent of the type consisting of a solution of acrylic resin in the monomer of the latter is eliminated by pyrolysis during the brazing-diffusion treatment at 1200° C.

European Patent No. 075,497 also provides for applying, instead of a paste, a strip or tape obtained by lamination of an intimate mixture of basic and brazing powders and of acrylic resin.

European Patent No. 075,497 also provides for adding on an elementary part of simple shape in the form of a pre-sintered blank obtained from the mixture of basic and brazing powders, the surface of the pre-sintered blank acting as the connecting layer.

The patent cites in particular as application the plugging of hub support holes on hollow turbine blades, made of alloy NK15CADT according to the AFNOR designation, coming from the foundry. According to the AFNOR designation, the alloy NK15CADT is a nickel alloy containing approximately 15% cobalt based on the weight of nickel, and lesser amounts of chromium, aluminum, molybdenum and titanium. For that, there is introduced into the hole a plug consisting of a pre-sintered blank containing 75% by weight of basic powder of alloy NK17CDAT according to the AFNOR designation, and 25% by weight of brazing powder of Ni—Co—Si—B alloy, and self-brazing is carried out at 1200° C. for 15 minutes. According to the AFNOR designation, the alloy NK17CDAT is a nickel alloy containing approximately 17% cobalt based on the weight of nickel, and lesser amounts of chromium, molybdenum, aluminum, and titanium.

The use of the method described in that patent is nevertheless subject to a certain number of limitations.

The use of pastes or tapes containing, in addition to the basic and brazing powders, a binding agent which it is necessary to decompose and the decomposition products of which must be eliminated during brazing-diffusion, requires the use of furnaces capable of eliminating large quantities of gas coming from the pyrolysis of the binding agent. Such furnaces are poorly suited to the brazing-diffusion operation which takes placed at around 1200° C. and generally under vacuum.

Another problem to be solved is the production of elementary parts in the form of pre-sintered blanks. European Patent No. 075,497 does not indicate any method for producing such blanks and envisages only simple shapes.

The shaping of the blanks may be envisaged by uniaxial cold compacting, but this method does not make it possible to produce very slender or thin shapes of homogeneous density because of friction between powder grains or between grains and walls of the compacting die. Moreover, in order to limit the friction, lubricants of the zinc stearate type or similar are used as additive to the powders; these lubricants are capable of introducing zinc into the blank, which element has a harmful effect on the service life of the superalloys.

Other methods for shaping the blanks are in fact used, such as plasma spraying onto a rotating substrate and cutting of tapes by laser.

Plasma spraying makes it possible to produce blanks of tubular shape generated by rotation, by spraying metal powder onto a rotating cylindrical mandrel. Such a method has a very low yield, around 90% of the sprayed powder being sprayed elsewhere than onto the rotating mandrel, which severely affects the cost of producing the blanks, taking into account the extremely high cost of the metal powders sprayed. Furthermore, this method does not ensure clean edges at the end of the blank, which necessitates re-cutting and further increases the cost of the parts.

The laser cutting of tapes obtained by slip casting, elimination of the solvent and sintering, makes it possible only to obtain relatively thin flat parts. The losses resulting from the laser cutting, however, are high and represent ⅔ rds of the material employed.

The consolidation of self-brazing pre-sintered blanks obtained by powder metallurgy is described in U.S. Pat. No. 4,937,042 which concerns the production of fixed facing friction parts of the fins of gas turbines. The blanks consist of a mixture of a first superalloy powder of the M—Cr—Al or M—Cr—Al—Y type not containing Si, and of a second powder of the M—Cr—Al—Si type containing around 10% by weight of Si, the element Si being the melting element and M representing the element Co or the element Ni or a combination of these two elements. The blanks are pre-sintered at a temperature below the solidus temperature of the second powder.

The consolidation brought about by such pre-sintering is very limited, taking into account the low sintering capacity of the superalloys. The blanks thus obtained are therefore not easily handled.

SUMMARY OF THE INVENTION

The present invention provides for parts intended to be assembled by self-brazing to receiving metal parts, the molded parts being able to be of very varied and even complex shapes and having relatively precise dimensional characteristics, and being obtained by a powder metallurgy method having a high yield, that is to say, the ratio between the mass of the molded part obtained and the mass of metal powders employed in order to do this is close to 1.

The present invention provides for parts having a controlled relative density close to 1, the density of which is homogenous in the volume of the part and containing no harmful elements or "poisons" for the wear characteristics of these parts.

The present invention provides for producing relatively slender solid molded parts the length/width ratio of which is, for example, at least 5 and relatively thin hollow molded parts the diameter/thickness ratio of which is, for example at least 10.

The present invention provides a method using powder metallurgy for manufacturing molded parts intended to be assembled by self-brazing to receiving metal parts.

The method employs two metal powders, a first powder termed "basic powder" making it possible to obtain the desired metallurgical characteristics, and a second powder termed "brazing powder" made of alloy including a melting element at a content such that the liquidus temperature of the brazing powder is below the solidus temperature of the basic powder, the basic powder not including in its chemical composition any voluntary addition of melting element.

The chemical composition of the basic powder may if necessary be obtained from a mixture of powders.

The chemical composition of the basic powder and that of the brazing powder make it possible to define a self-brazing temperature which is higher than the liquidus temperature of the brazing powder and below the solidus temperatures of the basic powder and the receiving part.

The method according to the invention comprises the following sequence of steps:

a) a homogenous mixture of basic metal powder, brazing powder and a liquid binding agent is prepared.

As used herein, a "binding agent" is a constituent or a group of constituents making it possible to bind the metal powder grains to one another to form a mixture of homogeneous appearance.

The binding agent of the present invention may comprise additives intended, for example, to facilitate the dispersion, the suspension of the metal powders, or to improve other characteristics of the mixture.

As used herein the "liquid" for the binding agent comprises the molten state and corresponds to various consistencies that can be characterized by their viscosity.

The binding agent is selected to be able to gain consistency when it is i.e., assuming a state capable of retaining a shape contrary, for example, to the liquid state.

b) The mixture thus prepared is injected into a mold of the molded; part to be produced, while applying an appropriate pressure to the said mixture.

The geometry of the mold is adapted to that of the molded parts to be produced, taking into account the dimensional variations resulting from the method, which dimensional variations a person skilled in the art is able to predict from experience or take account of from preliminary tests.

The molding is maintained in conditions of temperature, injection pressure and time such that the binding agent gains consistency.

c) Once the binding agent has become consistent, the mold blank is removed from the mould.

d) The binding agent is eliminated from the molded blank by a known appropriate means or combination of means such as, for example, physical, thermal or chemical means. This step is termed "binding agent elimination" and the blank which emerges from it is termed "with binding agent eliminated".

e) The blank with binding agent eliminated is subjected to a sintering treatment intended to densify it to a relative density of at least 95%, sintering being carried out at a temperature higher than the liquidus temperature of the brazing powder but below the temperature of the subsequent self-brazing treatment.

The condition regarding the minimum sintering temperature makes it possible to ensure the sintering in the liquid phase necessary for obtaining molded parts having a relative density close to unity, even in the case of basic powders having a low sintering capacity, a high density after sintering making it possible to limit dimensional changes during self-brazing.

The condition regarding the maximum sintering temperature makes it possible to ensure the formation of a sufficient quantity of liquid phase during self-brazing to assemble the molded part reliably to the receiving part.

The self-brazing conditions themselves are known to a person skilled in the art of this type of assembly.

The sequence of steps of the method of the invention, namely, preparation of an injectable mixture, moulding, extraction, elimination of the binding agent and sintering, corresponds schematically to those of a method for injection moulding of powdery metallic materials, which method is designated by MIM, an abbreviation of "metal injection moulding".

Variants of such MIM methods are described for example in U.S. Pat. No. 4,197,118, WO 88/07902 and WO 88/07903.

The MIM techniques described in those patents filed 10 to 20 years ago are used to produce finished parts having a relative density very close to unity, and a person skilled in the art was not taught transpose these techniques to obtain components having characteristics opposed to the characteristics associated with the products resulting from the MIM techniques, the products obtained by the method of the present invention being "semi-finished", not completely densified and intended to undergo partial fusion when they are made use of.

Advantageously, but not exclusively, the method of the present invention applies to basic metal powders of superalloys based on Ni, Co or Fe. The brazing powder is then an alloy of Ni, Co or Fe in which the melting element is Si, B or both these elements at the same time.

Preferably, the brazing powder contains, in the case where the element Si is used alone or in combination as melting element, 2 to 12% by weight of Si.

Preferably, in the case where the element B is used alone or in combination as melting element, the brazing powder contains 1 to 5% by weight of B.

Preferably, the alloy of the brazing powder is selected from the following list of alloys: Ni—Si, Ni—B, Ni—Co—Si, Ni—Co—B, Ni—Co—Si—B, Ni—Cr—Al—Si, Ni—Co—Cr—Al—Si, Ni—Cr—B, Ni—Co—Cr—B.

In the alloy of the brazing powder, the unspecified elements are present in their customary content, taking into account the base materials used and the methods for preparation of the alloy.

Preferably, the percentage by weight of brazing powder in relation to the whole of the two metal powders is between 5 and 40% and depends on the nature of the two powders.

Preferably again, the charge of metal powders is at least 50% by volume in the mixture produced with the binding agent.

As indicated above, different variants of the MIM method may advantageously be employed in the method of the invention.

The mechanism of gain of consistency of the blank in the mold may, according to a first variant of the method of the present invention, be a physical liquid-solid change of state of the binding agent obtained by maintaining the mold at a temperature below the temperature of said change of state.

The temperature of the mould is of course selected such as to produce the solidification of the binding agent in spite of any possible supercooling phenomena and while taking account of the influence of the presence of any additives in the binding agent.

According to a sub-variant of this first variant of the method of the present invention, the binding agent may be or comprise a thermoplastic resin, the binding agent/metal powders mixture then being prepared at a temperature higher than the melting temperature of the binding agent and injected into the mould also at a temperature higher than this melting temperature.

According to another sub-variant of this first variant of the method of the present invention, the binding agent may be an aqueous or non-aqueous system liquid at ambient temperature, and the mixture prepared with the metal powders is injected into a mould cooled to a temperature below the solidification temperature of the binding agent.

The step of elimination of the binding agent in this sub-variant comprises an operation of lyophilization or sublimation of the binding agent.

According to another variant of the method of the present invention, the binding agent is a thermosetting resin and the mechanism of gain of consistency of the binding agent is an accelerated polymerisation of the resin, for example in a heated mould.

According to yet another variant of the method of the present invention, the binding agent is capable of a sol-gel reaction which is employed during the moulding step. The step of elimination of the binding agent then comprises an operation of putting the binding agent, or its essential constituents, back into solution.

Advantageously, in these different variants of the method of the present invention, the step of elimination of the binding agent may comprise an operation of putting into solution at least one component for the binding agent by the chemical action of a solvent for the component or components.

When the binding agent comprises a polymer, the step of elimination of the binding agent may advantageously comprise an operation of depolymerisation of said polymer by the chemical and/or catalytic action of a specific agent.

Again advantageously, the step of elimination of the binding agent may comprise more than one operation, the final operation being an operation of thermal elimination of the binding agent.

Very advantageously in this case, the operation of thermal elimination of the binding agent continues up to a temperature ensuring the start of consolidation or "pre-sintering" of the metal powders. This pre-sintering makes it possible to handle the blanks with binding agent eliminated, without risk of breakage, before subjecting them to the sintering step intended to densify them.

As used herein, the term "sintering" is reserved for the operation which transforms the "blanks" with binding agent eliminated into low porosity self-brazing molded parts knowing that, during self-brazing, the physical process of sintering and elimination of the residual porosity continues in the molded parts.

Preferably, in order to permit the pre-sintering of the blanks with binding agent eliminated, the thermal elimination of the binding agent is terminated at a temperature within the melting range of the brazing powder and very preferably in the lower half of the range.

Still more preferably, the sintering step is carried out at a temperature approximately 50° C. below that of the subsequent self-brazing operation.

Optionally, the operation of thermal elimination of the binding agent and the sintering step may be carried out successively in the same furnace without a return to ambient temperature between these two operations or steps.

The molded parts obtained after sintering have very regular dimensions which require little or no dimensional retouching by machining to be able to fit the receiving parts and produce a solid self-brazed assembly.

Owing to the forced elimination of the binding agent during binding agent elimination, the molded parts resulting from the method of the present invention do not contain any chemical element other than those which constitute the metal powders employed.

The present invention also covers a method of assembly of the self-brazing molded parts, obtained by the manufacturing method according to the present invention, to receiving parts which are superalloy components of aeronautic or land gas turbines.

According to this method of assembly, the alloy of which the basic powder consists is selected for its compatibility with the superalloy of the receiving parts, and the molded part is pre-assembled to the receiving part by arranging it in contact with or at a small clearance from the receiving part. This may impose known conditions regarding the shape and dimensions of the molded part and of the facing portions of the receiving part.

The pre-assembly between these two parts is then brought to a temperature higher than the liquidus temperature of the brazing powder and below the solidus temperature of the basic powder and of the receiving part in order to carry out self-brazing.

Preferably, and in particular during the application of the method to the repair of parts, the self-brazing treatment is followed directly, or after returning to ambient temperature, by a diffusion treatment intended to diffuse the chemical elements, and especially the melting element or elements, and to homogenize the structure of the repaired area.

BRIEF DESCRIPTION OF THE DRAWINGS

The following figures illustrate in a non-limiting manner an example of a molded part and examples of implementation of the manufacturing and assembly methods of the present invention.

DETAILED DESCRIPTION OF THE PRESENT INVENTION

Figure 1:
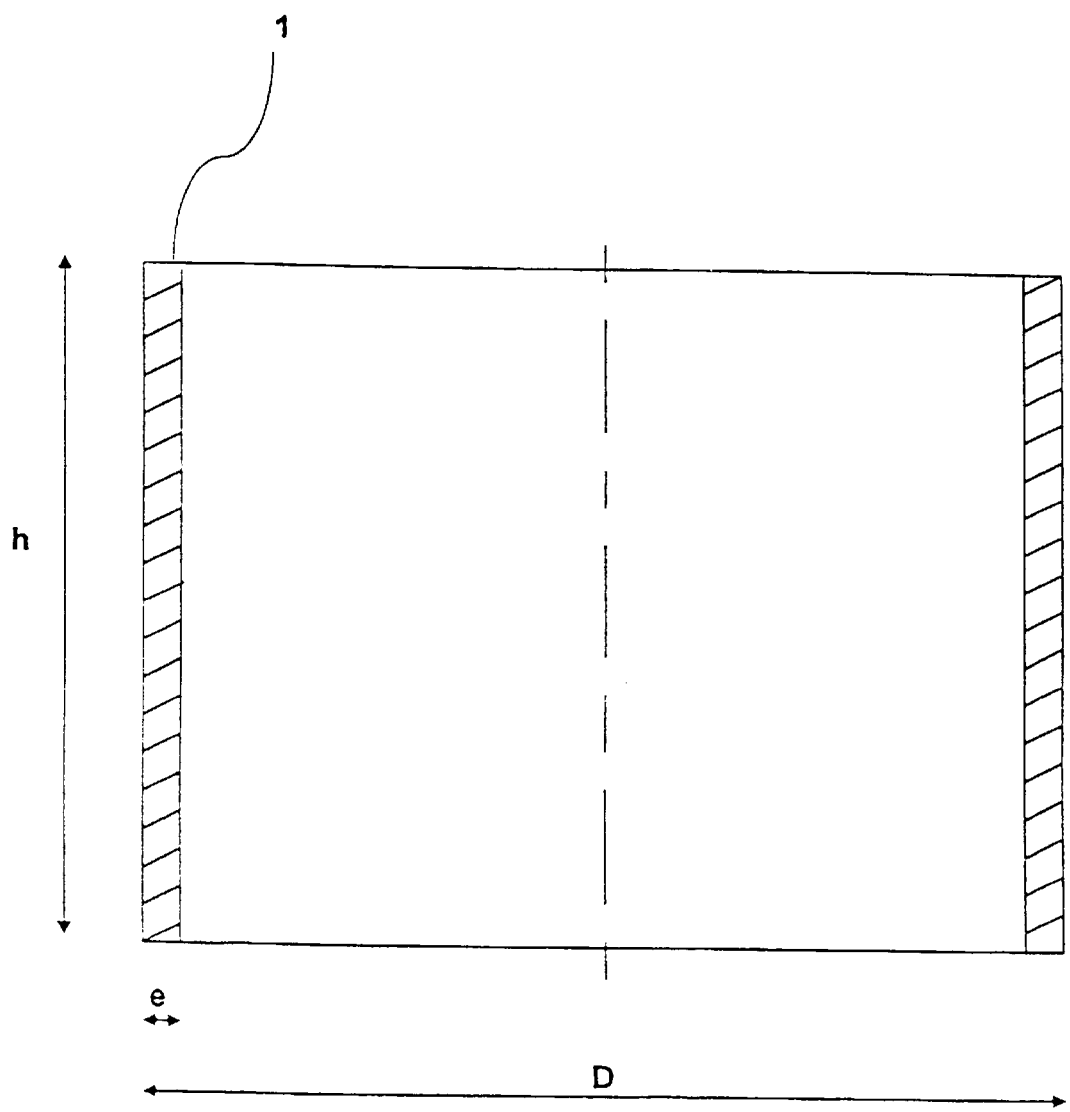
FIG. 1 shows a self-brazing molded part of the annular bush type made of superalloy.

FIG. 1 shows a tubular self-brazing bush 1 made of nickel-based superalloy.

Its outside diameter D is of the order of 12 mm and its thickness e of the order of 0.6 mm. It is therefore a thin part with a high D/e ratio, of the order of 20. Its height $\underline{h}$ is of the order of 10 mm.

Since the bush is intended to be self-brazed in a blind hole of an aeronautic gas turbine blade made of superalloy having the commercial designation René 77 (Ni alloy of type NK15CDAT), the tolerance on its outside diameter is very tight, of the order of a few hundredths of a mm, so as to center the bush perfectly, to limit its geometric distortions during self-brazing and to facilitate its connection to the receiving part, i.e. the turbine blade. According to the AFNOR designation, the alloy NK15CDAT is a nickel alloy containing approximately 15% cobalt based on the weight of nickel, and lesser amounts of chromium, molybdenum, aluminum, and titanium.

The bush 1 is made of nickel-based superalloy by the powder metallurgy method according to the present invention by means of two metal powders, a basic powder A and a brazing powder B.

The basic powder A is a known alloy powder having the commercial designation Astroloy (NK17CDAT according to the AFNOR designation). This material is completely compatible with the René 77 superalloy of the blade, especially from the point of view of solidus temperature and mechanical characteristics. According to the AFNOR designation, the alloy NK17CDAT is a nickel alloy containing approximately 17% cobalt based on the weight of nickel, and lesser amounts of chromium, molybdenum, aluminum, and titanium.

The solidus temperature of the basic powder A is 1240° C. Its liquidus temperature is 1280° C.

The brazing powder B used to carry out the sintering of the Astroloy powder and self-brazing with the blade is an Ni—Co—Si—B alloy powder containing, by weight, 17% Co, 4% Si, 2.7% B.

The solidus temperature of the brazing powder B is 965° C. Its liquidus temperature is 1065° C. and is below the solidus temperatures of the basic powder A and of the blade.

These data make it possible to define a self-brazing temperature of 1200° C. which is higher than the liquidus temperature of the brazing powder but which is below the solidus temperature of the blade made of René 77 and that of the Astroloy powder A.

Figure 2:
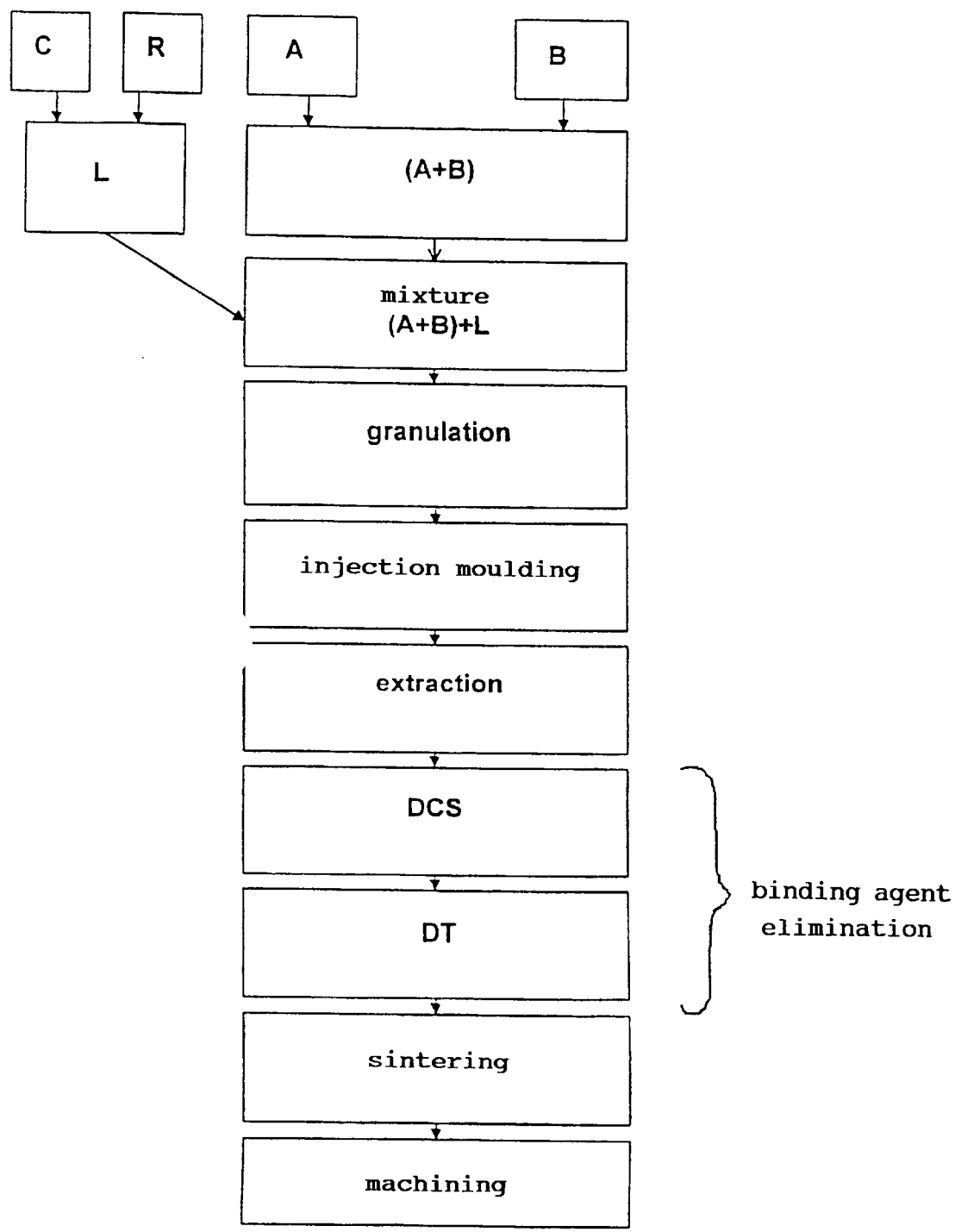
FIG. 2 is a diagram of the steps of a first variant of the manufacturing method according to the present invention of the bush in FIG. 1, which variant employs a thermoplastic resin.

FIG. 2 describes a first variant of implementation of the method according to the invention.

The two metal powders A and B are powders with spherical grains atomized with argon and their particle size grading is 53 μm or less.

The two metal powders A and B are pre-mixed with one another under an inert atmosphere. The pre-mixing of the two metal powders A and B is designated by (A+B).

The proportion by weight of Astroloy powder A to the brazing powder B is 3:1, which corresponds to a percentage by weight of 25% of powder B in the pre-mix (A+B) of the two metal powders.

According to this first variant, a paste-like mixture is prepared from the two pre-mixed metal powders (A+B) with a binding agent L melted at around 180° C. in a mixer under inert gas.

The binding agent L consists of a mixture of wax C and of thermoplastic resin R, for example of the polyethylene or polypropylene type.

The charge by volume of metal powders (A+B) in the mixture is 70%.

The homogeneous mixture obtained is cooled and ground to constitute granulates.

The granulates obtained may be handled and stored without any problem at ambient temperature, the grains of metal powders being coated with solidified binding agent.

In the following step of injection molding, the granulates are introduced into the Archimedean screw of a press of the type for injection molding objects made of synthetic material, the Archimedean screw being heated to around 180–200° C. so as to melt the binding agent of the granulates and to obtain a metallic paste, the viscosity of which is between $10^4$ and $10^7$ cpoise and which is therefore suitable for being injected by the Archimedean screw into a mold.

The mold, produced from tool steel, is composed of two parts bearing one upon the other by a joining plane, the two parts, when they are placed upon one the other, delimiting an annular cavity or impression into which the metallic paste is injected by means of the Archimedean screw.

The dimensions of the impression of the mold are those of the bush to be produced except for a coefficient, the blank undergoing dimensional variations during the subsequent manufacturing operations, especially shrinkage during sintering.

In the case of the bushes in FIG. 1, the impression therefore has dimensions equal to 1.15×those of the bush.

The shrinkage may not be isotropic; to define the dimensions of the mould, different shrinkage coefficients are then applied according to the directions.

A person skilled in the art can predict these dimensional variations, if necessary by means of some preliminary tests intended to take into account the influence in particular of the characteristics of the metal powders and of the binding agent used, of the charge of metal powders in the mixture, and of the sintering conditions.

The mold is maintained at the temperature of the order of 45° C. to permit both correct filling of the impression and the solidification of the metallic paste in about 1 minute.

Once the blank has solidified, the two parts of the mould are separated and the blank is extracted from the impression.

The construction of the mold should take into account the constraint of being able to extract the moulded blanks without damaging them, but taking into account such a constraint is known in the field of injection moulding.

The following step of the method according to FIG. 2 is the elimination of the binding agent, which is carried out in two successive operations.

A first operation is chemical binding agent elimination, DCS, by the action of a solvent which is hexane and which dissolves the wax of the binding agent. This binding agent elimination is carried out in the vapor phase and in the liquid phase by immersion.

The second operation of binding agent elimination carried out is thermal binding agent elimination, DT, in a furnace under a hydrogen atmosphere.

This second operation first comprises a rise and then maintaining around 400–500° C. where pyrolysis of the thermoplastic resin not dissolved by the hexane takes place.

Pyrolysis in a hydrogenated medium leaves almost no residue of the binding agent.

The blank is extremely porous at that moment, the pores occupying the volume left free by the departure of the binding agent. The grains of metal powders have only a low cohesion between them, which means that the blank is sensitive to shocks and is not easily handled.

The temperature is then raised in the thermal binding agent elimination furnace to 1000° C. in order to carry out pre-sintering of the blanks with binding agent eliminated. At this temperature, higher than the solidus temperature of the brazing powder B (965° C.) and located at ⅓ rd of its melting range, the powder B melts partially and the liquid phase from B infiltrates the surface of the unmelted powder grains, especially those of the basic powder A, forming metallic bridges between the grains and thereby effecting the consolidation of the structure.

The blanks are maintained at 1000° C. for around 10 minutes, then cooled to ambient temperature.

Pre-sintering at a lower temperature, slightly below the solidus temperature of the brazing powder B, for example at 950° C., would not permit the formation of metallic bridges and the blanks would be too fragile to be able to be handled subsequently, taking into account their very slight thickness, less than a mm.

Pre-sintering at a temperature higher than 1000° C. would result in the formation of too much liquid phase at the pre-sintering stage.

A relatively slow rise to 1000° C. also contributes to the quality of the pre-sintering. A speed of the rise of the order of 500° C./hour gives satisfactory results.

After this operation of thermal elimination of the binding agent, the blanks are introduced into the sintering furnace, which is a vacuum furnace.

Sintering is carried out by a rise in stages to 800° C., then by a rise to 1150° C., or a temperature above the liquidus temperature of the brazing powder B and 50° C. below the temperature envisaged for the self-brazing of the bushes on the blade made of René 77.

The bushes are maintained at 1150° C. for 15 minutes. These conditions are sufficient to obtain forced densification of the parts to more than 96% while retaining sufficient potential for formation of the liquid phase during self-brazing.

After cooling to ambient temperature, accelerated by the introduction of argon into the furnace, the annular bushes are checked and if necessary retouched by rectification if, in particular, their outside diameter is too large for their use.

Figure 3:
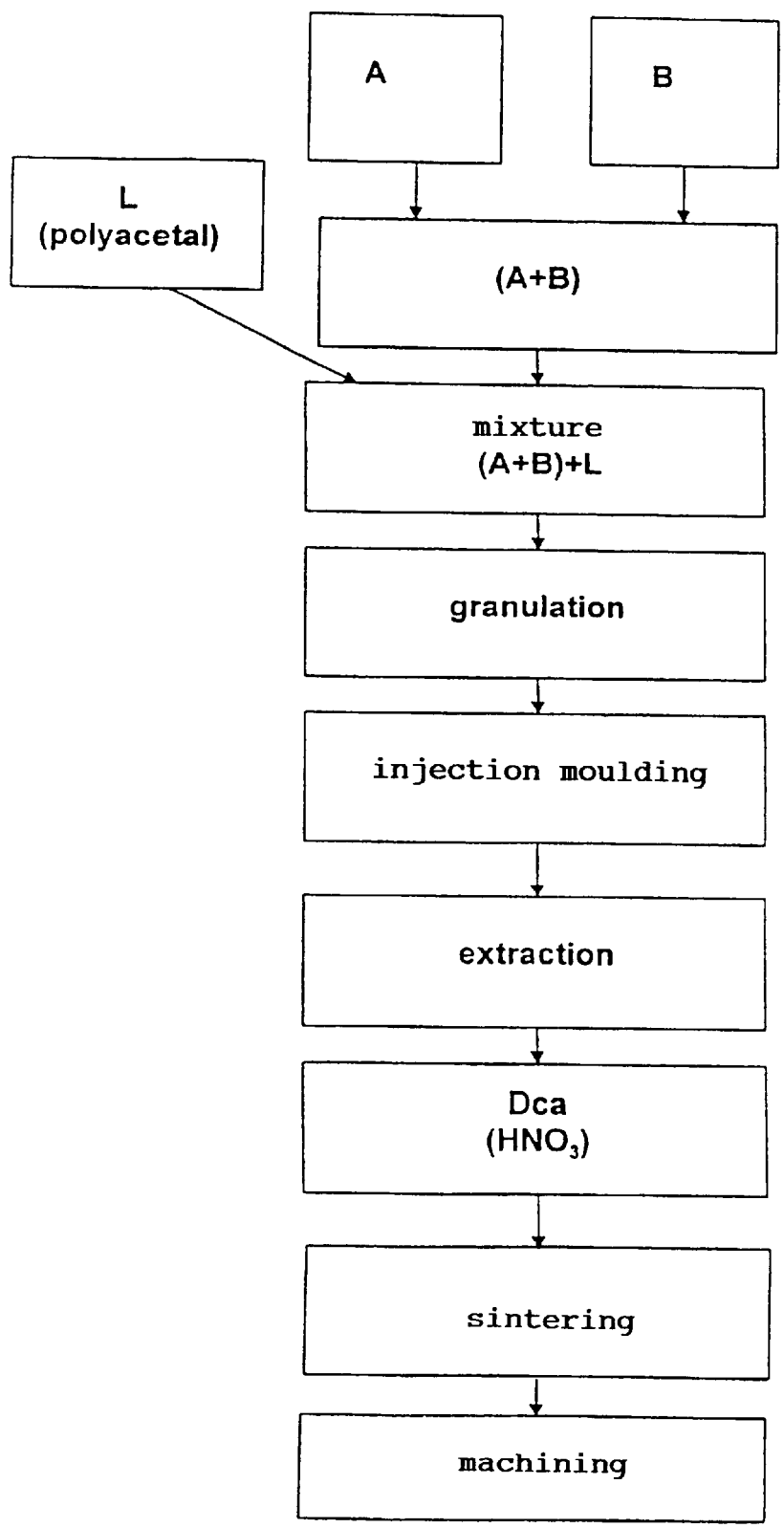
FIG. 3 is a diagram of the steps of a second variant of the manufacturing method according to the present invention of the bush in FIG. 1, which variant also employs a thermoplastic resin.

FIG. 3 describes a second variant for manufacturing the annular bushes in FIG. 1.

A homogeneous mixture is prepared from the same two metal powders (A+B) pre-mixed with a melted binding agent L which this time consists of a thermoplastic resin, polyacetal, the charge of metal powders being 65% by volume in the mixture. The mixture is granulated as in the first variant.

As in the first variant, the granulates are heated until the binding agent melts and are injected into the mold of an injection moulding press.

After their extraction from the mould, the solidified molded blanks undergo catalytic binding agent elimination, DCa, at 110° C. by means of gaseous $HNO_3$.

This agent depolymerizes the polyacetal which is transformed into a gaseous monomer, formaldehyde, which is evacuated.

This step of catalytic elimination of the binding agent makes it possible to eliminate the binding agent almost completely, the operation of thermal elimination of the binding agent therefore being rendered unnecessary.

The blank with binding agent eliminated is then directly sintered in a furnace under vacuum at 1150° C. as for the first variant.

Figure 4:
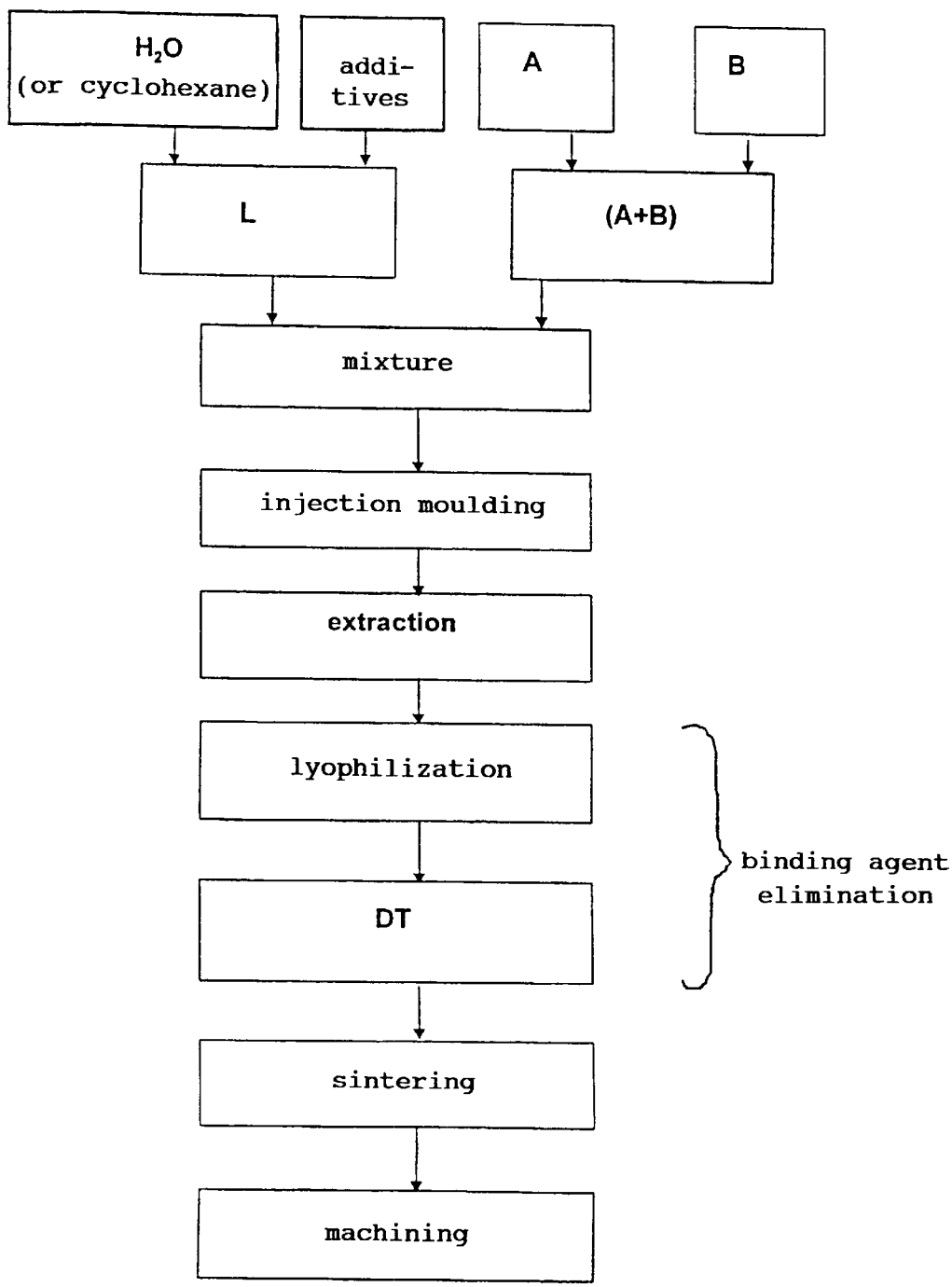
FIG. 4 is a diagram of the steps of a third variant of the manufacturing method according to the present invention of the bush in FIG. 1, which variant employs a binding agent liquid at ambient temperature.

FIG. 4 describes a third variant for manufacturing the annular bushes in FIG. 1.

This time, a mixture is prepared from the same metal powders (A+B) pre-mixed with a binding agent L which is liquid at ambient temperature.

The binding agent L may be an aqueous or non-aqueous system.

In the case where an aqueous system is used, the major constituent of the binding agent is water, additives to the water improving the dispersion and the suspension of the metal powder grains, making it possible to condition the viscosity of the mixture at ambient temperature or having a cryo-protective role. Patent Application WO 88/07902 describes such aqueous systems.

The metallic slip thus constituted with the aqueous system L and a charge of the order of 60% of metal powders (A+B) has a viscosity of between $10^3$ and $10^4$ cpoise and may be conserved in closed receptacles before injection molding.

The injection molding operation is then carried out in a mould made of tool steel cooled to −40° C. or to a lower temperature.

European Patent No. 587 483 describes a press for injecting such slips and in particular the injection head of the press.

European Patent No. 626 224 describes a device for carrying out the molding of such slips at temperatures below ambient temperature without causing frosting of the surface of the impression or of the joining plane of the mould.

The use of a non-aqueous system as an alternative to an aqueous system is described in Patent Application WO 88/07903.

It is possible, for example, to use cyclohexane with additives such as a dispersant for dispersing the metal powders, and a colloid for conditioning the viscosity of the mixture.

The mold is in this case maintained at a temperature of the order of −20° C.

Whether the binding agent L is an aqueous system or a non-aqueous system, the metallic ice blocks extracted from the mould after solidification of the slip are kept at a low temperature and then the binding agent is eliminated in two operations.

The first operation of elimination of the binding agent is a known lyophilization operation, the water or the cyclohexane being eliminated by sublimation during this operation.

The second operation of elimination of the binding agent is a thermal binding agent elimination which makes it possible to burn the additives to the water or to the cyclohexane which have not been eliminated during lyophilization.

The thermal binding agent elimination is conducted in the same manner as in the case of the variant of FIG. 2, and also makes it possible to pre-sinter the blanks obtained by finally rising to 1000° C.

The sintering step is also carried out in the same manner as for the variant of FIG. 2.

The method for manufacturing self-brazing molded parts according to the present invention is not of course limited to the variants described above.

The results obtained on the annular bush in FIG. 1 manufactured according to the present invention by the variant of FIG. 2 are as follows:

Absolute density of the sintered bush: 7.83, or a relative density of 98%.

Carbon content of the bush=0.03%,

Grain size=n°6.5 according to specification ASTM E112,

Typical deviation on inside diameter=0.01 mm,

Mean deviation of circularity on inside diameter.

The deviation of circularity is taken as equal to the difference between maximum diameter and minimum diameter over a same section.

The mean deviation is taken as equal to the average of the deviations over a same batch of parts.

The mean deviation of circularity on the inside diameter measured at 25% of the height of the bush is 0.02 mm.

The mean deviation of circularity on the inside diameter measured at 75% of the height of the bush is 0.03 mm.

A rapid description will now be given of the method of assembly according to the invention by means of the same example.

There is produced in the turbine blade made of René 77 superalloy a bore of very precise diameter, with a tolerance of a few hundredths of a mm, for example, and the outside diameter of the bush in FIG. 1 is retouched if necessary to allow it to be force-fitted into the bore of the blade.

This force-fit pre-assembly is then brought under vacuum to 1200° C., maintained at this temperature for 15 minutes, then cooled to ambient temperature.

The quality of the assembly obtained can then be checked.

It is also possible to carry out a diffusion treatment in the solid state for 2 hours at 1200° C., either in the self-brazing furnace or subsequently after a return to ambient temperature.

Finally, a quality heat treatment can be carried out on the assembly produced.

What is claimed is:

1. A powder metallurgy method for manufacturing a molded part which is to be assembled by self-brazing at a specific temperature to a receiving metal part, the method comprising:

preparing a homogeneous mixture of basic powder, brazing powder and binding agent, wherein the basic powder is made of an alloy making it possible to obtain desired metallurgical characteristics and has substantially no melting element, the brazing power is made of an alloy including at least one melting element at a content such that the liquidus temperature of the alloy of the brazing powder is below the solidus temperature of the alloy of the basic powder, the basic powder and brazing powder being selected such that the liquidus temperature of the brazing powder is below the self-brazing temperature and the solidus temperature of the basic powder is higher than the self-brazing temperature;

injection molding the mixture into a mold at a sufficient temperature, pressure and time such that the binding agent gains consistency and forms a molded blank;

extracting the molded blank from the mold;

removing the binding agent from the molded blank; and sintering the molded blank at a temperature higher than the liquidus temperature of the brazing powder but below the temperature of the subsequent self-brazing treatment so as to obtain a molded part suitable for self-brazing and having a relative density of at least 95%.

2. The powder metallurgy method for manufacturing the molded part of claim 1, wherein the basic powder has a chemical composition corresponding to a superalloy based on Ni, Co or Fe and the brazing powder has a composition corresponding to an alloy based on Ni, Co or Fe and has a melting element comprising at least one of Si or B.

3. The powder metallurgy method for manufacturing the molded part of claim 2, wherein the brazing powder comprises 2 to 12% by weight of Si.

4. The powder metallurgy method for manufacturing the molded part of claim 2, wherein the brazing powder comprises 1 to 5% by weight of B.

5. The powder metallurgy method for manufacturing the molded part of claim 2, wherein the brazing powder comprises an alloy selected from Ni—Si, Ni—B, Ni—Co—Si, Ni—Co—B, Ni—Co—Si—B, Ni—Cr—Al—Si, Ni—Co—Cr—Al—Si, Ni—Cr—B or Ni—Co—Cr—B.

6. The powder metallurgy method for manufacturing the molded part of claim 1, wherein the brazing powder is between 5 to 40% by weight of the total weight of the brazing powder and the basic powder.

7. The powder metallurgy method for manufacturing the molded part of claim 1, wherein the basic powder and the brazing powder are at least 50% by volume of the mixture of the basic powder, the brazing powder and the binding agent.

8. The powder metallurgy method for manufacturing the molded part of claim 1, wherein the gain in consistency of the binding agent is a result of a physical liquid-solid change of state of the binding agent obtained by maintaining the mold at a temperature below the temperature of the change of state.

9. The powder metallurgy method for manufacturing the molded part of claim 8, wherein the binding agent comprises a thermoplastic resin.

10. The powder metallurgy method for manufacturing the molded part of claim 9, wherein the removing the binding agent from the molded blank comprises dissolving at least one component of the binding agent in a solvent for the at least one component.

11. The powder metallurgy method for manufacturing the molded part of claim 9, wherein the removing the binding agent from the molded blank comprises depolymerizing the thermoplastic resin.

12. The powder metallurgy method for manufacturing the molded part of claim 9, wherein the binding agent comprises an aqueous system or a non-aqueous liquid system at ambient temperature and the removing the binding agent from the molded blank comprises lyophilizing or sublimating a main constituent of the binding agent.

13. The powder metallurgy method for manufacturing the molded part of claim 1, wherein the binding agent comprises a thermosetting resin and wherein the gain in consistency of the binding agent is obtained by polymerizing the thermosetting resin.

14. The powder metallurgy method for manufacturing the molded part of claim 13, wherein the removing the binding agent from the molded blank comprises dissolving at least one component of the binding agent in a solvent for the at least one component.

15. The powder metallurgy method for manufacturing the molded part of claim 13, wherein the removing the binding agent from the molded blank comprises depolymerizing the thermoplastic resin.

16. The powder metallurgy method for manufacturing the molded part of claim 1, wherein the gain in consistency of the binding agent is obtained by a sol-gel reaction of the binding agent during molding and the removing the binding agent from the molded blank comprises putting the gel obtained back into solution.

17. The powder metallurgy method for manufacturing the molded part of claim 1, wherein the removing the binding agent from the molded blank comprises thermally removing the binding agent.

18. The powder metallurgy method for manufacturing the molded part of claim 17, wherein the thermally removing the binding agent continues up to a temperature effecting the pre-sintering of the molded blank without the binding agent.

19. The powder metallurgy method for manufacturing the molded part of claim 18, wherein the pre-sintering is terminated at a temperature within a melting range of the brazing powder.

20. The powder metallurgy method for manufacturing the molded part of claim 19, wherein the pre-sintering is terminated at a temperature within a lower half of the melting range of the brazing powder.

21. The powder metallurgy method for manufacturing the molded part of claim 20, wherein the thermally removing the binding agent and the sintering the molded blank are carried out successively in the same furnace without a return to ambient temperature during the thermally removing or the sintering.

22. The powder metallurgy method for manufacturing the molded part of claim 1, wherein the sintering is carried out at a temperature about 50° C. below a temperature of self-brazing of an assembly of the molded part and the receiving part.

23. A method for assembly of the molded part made by the method of claim 1, wherein the basic powder is made of an alloy compatible with a superalloy of the receiving part, and wherein the molded part has a shape and dimension, permitting its pre-assembly to the receiving part, further comprising:

assembling the molded part with the receiving part, the receiving part being made of superalloy and being a component of aeronautic or land or gas turbine, and self-brazing the molded part to the receiving part at a temperature higher than the liquidus temperature of the brazing powder and below the solidus temperature of the basic powder and of the receiving part.

24. The method of assembly of claim 23, wherein the self-brazing is followed directly by a diffusion treatment.

25. The method of claim 24 wherein the receiving part comprises an alloy having the commercial designation of René 77, and wherein the molded part comprises an alloy having the commercial designation Astrology further comprising:

carrying out the self-brazing at a temperature of about 1200° C.

26. The method of assembly of claim 23, wherein the self-brazing is followed by a diffusion treatment after return to ambient temperature.

27. The method of claim 26 wherein the receiving part comprises an alloy having the commercial designation of René 77, and wherein the molded part comprises an alloy having the commercial designation Astrology further comprising:

carrying out the self-brazing at a temperature of about 1200° C.

28. A powder metallurgy method for manufacturing a molded part which is to be assembled by self-brazing at a specific temperature to a receiving metal part, said receiving part being made of superalloy and being a component of aeronautic or land or gas turbine, and said specific temperature being below the solidus temperature of the receiving part, the method comprising:

preparing a homogeneous mixture of basic powder, brazing powder and binding agent, injection molding the mixture into a mold at a sufficient temperature, pressure and time such that the binding agent gains consistency and forms a molded blank;

extracting the molded blank from the mold;

removing the binding agent from the molded blank; and sintering the molded blank at a temperature higher than the liquidus temperature of the brazing powder but below the temperature of the subsequent self-brazing treatment so as to obtain a molded part suitable for self-brazing and having a relative density of at least 95%; and wherein the basic powder is made of an alloy making it possible to obtain desired metallurgical characteristics and has substantially no melting element and the basic powder has a chemical composition corresponding to a superalloy based on Ni, Co or Fe;

wherein the brazing powder has a composition comprises an alloy selected from Ni—Si, Ni—B, Ni—Co—Si, Ni—Co—B, Ni—Co—Si—B, Ni—Cr—Al—Si, Ni—Co—Cr—Al—Si, Ni—Cr—B or Ni—Co—Cr—B and is between 5 to 40% by weight of the total weight of the brazing powder and the basic powder; and wherein the brazing powder is made of an alloy including at least one melting element at a content such that the liquidus temperature of the alloy of the brazing powder is below the solidus temperature of the alloy of the basic powder, the basic powder and brazing powder being selected such that the liquidus temperature of the brazing powder is below the self-brazing temperature and the solidus temperature of the basic powder is higher than the self-brazing temperature.

* * * * *